United States Patent [19]

Chew

[11] Patent Number: 4,623,283

[45] Date of Patent: Nov. 18, 1986

[54] METHOD FOR CONTROLLING WATER INFLUX INTO UNDERGROUND CAVITIES

[75] Inventor: Ju-Nam Chew, Dallas, Tex.

[73] Assignee: Mobil Oil Corporation, New York, N.Y.

[21] Appl. No.: 620,297

[22] Filed: Jun. 13, 1984

[51] Int. Cl.⁴ ............................................. C09K 17/00
[52] U.S. Cl. .................... 405/270; 166/295; 405/263; 405/57
[58] Field of Search ............................ 405/270, 52–56, 405/263, 267; 166/295

[56] References Cited

U.S. PATENT DOCUMENTS

| | | | |
|---|---|---|---|
| 2,865,177 | 12/1958 | Gnaedinger | 405/270 |
| 2,947,146 | 8/1960 | Loofbourow | 405/57 |
| 3,152,640 | 10/1964 | Marx | 405/53 X |
| 3,306,354 | 2/1967 | O'Brien | 405/57 X |
| 3,616,856 | 11/1971 | Knight | 166/292 X |
| 3,672,449 | 6/1972 | Richardson et al. | 166/292 |
| 3,713,489 | 1/1973 | Fast et al. | 166/292 |
| 3,815,681 | 6/1974 | Richardson | 166/292 X |
| 3,851,704 | 12/1974 | Maxson et al. | 166/292 |
| 3,866,682 | 2/1975 | Jones et al. | 166/292 X |
| 3,868,999 | 3/1975 | Christopher et al. | 166/292 |
| 3,915,727 | 10/1975 | Sparlin et al. | 405/270 X |
| 3,934,420 | 1/1976 | Janelid et al. | 405/56 |
| 3,965,986 | 6/1976 | Christopher | 166/292 |
| 4,072,191 | 2/1978 | Clampitt | 166/292 X |
| 4,232,741 | 11/1980 | Richardson et al. | 166/292 X |
| 4,290,485 | 9/1981 | Free et al. | 166/295 X |
| 4,352,396 | 10/1982 | Friedman | 166/295 |
| 4,361,186 | 11/1982 | Kalina | 166/295 |
| 4,366,194 | 12/1982 | Pilny et al. | 405/270 X |
| 4,385,132 | 5/1983 | Gruber et al. | 166/295 X |

*Primary Examiner*—Dennis L. Taylor
*Attorney, Agent, or Firm*—Alexander J. McKillop; Michael G. Gilman; Charles A. Malone

[57] ABSTRACT

Disclosed is a method for minimizing the entry of water into a mined cavity or underground formation which has thereabove a semi-permeable layer of a shaly material or rock directly below a source layer of water-saturated sand. By means of a borehole, a fluid such as air or oil is injected into a semi-permeable layer to displace water from it. The injected fluid acts as a barrier to reduce the downward leakage of water into the cavity.

11 Claims, 5 Drawing Figures

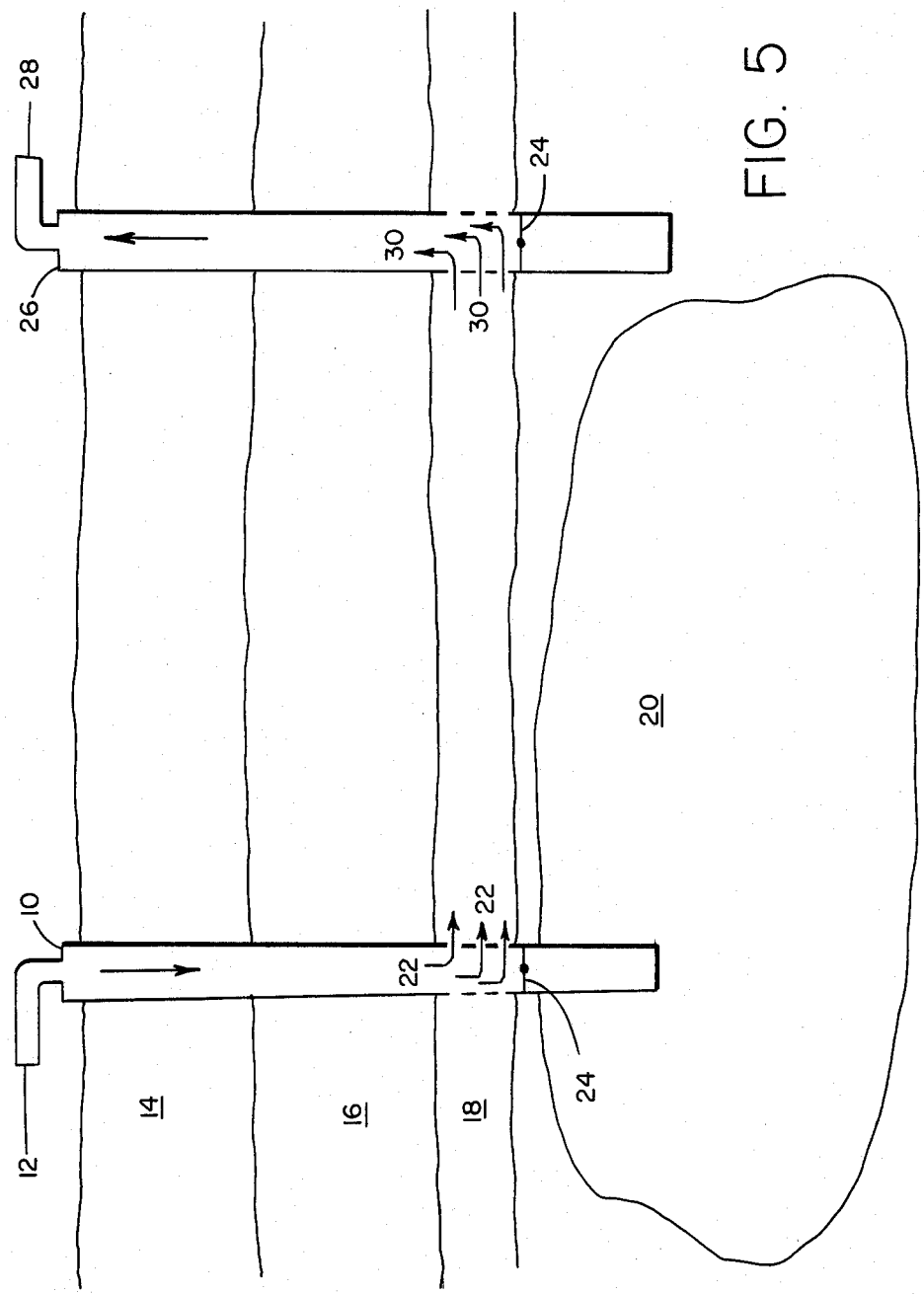

METHOD FOR CONTROLLING WATER INFLUX INTO UNDERGROUND CAVITIES

FIELD OF THE INVENTION

This invention relates to the treatment of subterranean earth formations. More particularly, this invention pertains to a method for treating subterranean formations comprised of a plurality of layers with a fluid blanket to reduce water influx. One such layer comprises a semi-permeable shaly material or rock lying above a subterranean mineral formation. Above the semi-permeable shaly material or rock is a layer of water-saturated sand or other similar material which causes water to enter downward into the mineral formation through the semi-permeable layer.

BACKGROUND OF THE INVENTION

In the underground coal gasification process, at least one injection borehole is drilled into the coal seam through which the combustion-supporting gas is supplied and a distance away is at least one production borehole where the combustion product gases are removed. During the gasification process, a cavity is formed in the coal seam as it is consumed. Frequently there is an aquifer above the coal. This aquifer is separated from the coal by a layer of shale or shaly sand which may not be adequate to keep undesired water from entering the cavity in excessive quantities.

In hydraulic borehole mining, a borehole is drilled into the formation to be mined. The mineral formation may contain coal, oil sand, uranium ore, phosphate rock, or some other substance. The borehole mining tool is inserted through this borehole where a water jet cuts the material into a slurry which is pumped back up through sections of the borehole mining tool via a jet pump. Thus a mined cavity is formed. Excessive water influx into this cavity from above can overload the jet pump and cause the water level to rise above the level of the water jet which will interfere with the cutting action of the jet.

SUMMARY OF THE INVENTION

The present invention contemplates a novel method for minimizing the entry of water into a mined cavity in an underground formation which has thereabove a semi-permeable layer of shaly material or rock below a layer of water-saturated sand or other aquifer rock. In one embodiment of this invention, a means for injecting fluid to displace water is inserted into the semi-permeable layer. This displacing fluid can be a non-wetting fluid such as a gas, or an oil which will reduce the relative permeability to water by replacing much of the water from the pores of the rock. The displacing fluid can also be any which can set up as a foam, gel, or solid to block said pore spaces. Also, the fluid can be one which changes the wettability of the pores so as to inhibit the flow of water.

In another embodiment of this invention, a fluid heavier than water, and substantially immiscible with it, is injected into a small vertical section of water-saturated sand or other similar aquifer formation immediately above the semi-permeable layer of shaly material or rock. After injection, the heavier-than-water fluid settles on top of the semi-permeable layer and acts as a barrier to the downward flow of water. Fluids which can be utilized include organic liquids, emulsions, and gels.

In yet another embodiment of this invention, a fluid lighter than water, and substantially immiscible with it, is injected into a small vertical section of the cavity formation immediately below the semi-permeable layer. The displacing fluid becomes trapped against the semi-permeable layer and acts to impede the downward flow of water. Fluids which can be utilized include gases, foams, and hydrocarbonaceous fluids.

Any of the above embodiments can be combined with a means for maintaining the pressure in a mined cavity at, or near, the pressure of the incoming water to minimize water influx into the cavity.

An object of this invention is to provide an efficient method to minimize the entry of water into a mined cavity or underground formation when there exists a thin semi-permeable layer above said cavity or formation and thereabove an area of water-saturated sand.

Another object of this invention is to utilize readily available resources, e.g., air, to prevent entry of water into an underground formation overlain by a thin semi-permeable shaly layer or rock which has thereabove an area of watersaturated sand or similar material.

BRIEF DESCRIPTION OF THE DRAWINGS

FIG. 5 is a schematic diagram illustrating an embodiment of the invention where an injection well and a production well is used.

DETAILED DESCRIPTION OF THE PREFERRED EMBODIMENTS

In underground mining operations such as coal gasification, hydraulic borehole mining, or conventional mining, water entry or influx into a mined cavity in an underground formation can cause undesired flooding. Oftentimes the flooding occurs because of water seepage through a semi-permeable layer of shaly material or rock above the mined cavity in the underground formation. Frequently, there occurs above this semi-permeable layer of shaly material or rock, sand which is saturated with water. As such, ordinary methods for preventing leakage into the mined cavity of the underground formation are of little avail. In the practice of the present invention, water leakage into a mined cavity is minimized.

Figure 1:
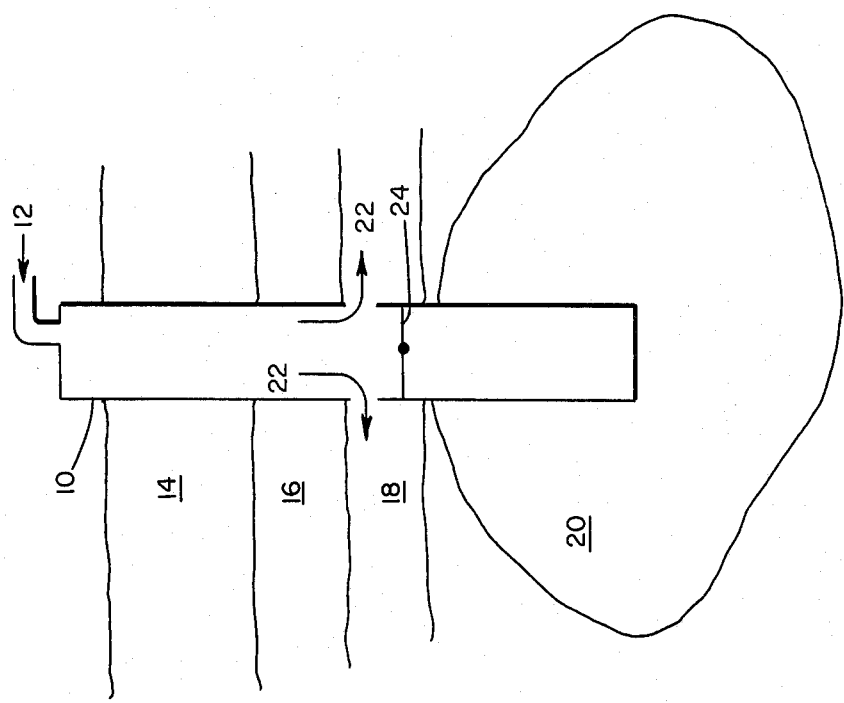
FIG. 1 is a schematic diagram illustrating an embodiment of the invention where fluid is placed into a semi-permeable shaly layer.

FIG. 1 illustrates one embodiment of the present invention. A fluid such as air is directed into an injection borehole or well 10 via line 12. Well 10 penetrates other strata 14, a water-bearing source layer 16, a semi-permeable shaly sand layer or rock 18, and the mined cavity 20. Air injected into well 10 is directed into the semi-permeable shaly sand layer or rock by openings 22 in the well casing. The air is prevented from entering the mined cavity section by a packer or valve means 24. The air is injected at a rate and for a time sufficient to substantially minimize entrance of water into mined cavity 20. When using this embodiment with one borehole, the fluid is injected with sufficient pressure to displace much of the water from the semi-permeable layer and thus create a barrier to the downward influx of water into the mined cavity.

The method of the present invention can be used where there is at least one injection well and at least one production well. This well arrangement is commonly used in underground coal gasification operations. FIG. 5 is an embodiment of the present invention employing an injection well 10 and a production well 26. Here, a fluid such as air is injected into injection well 10 which well penetrates the other strata 14, a water-bearing source layer 16, a semi-permeable shaly sand layer or rock 18, and into the mined cavity 20 or its potential location. Air injected via line 12 enters well 10 and subsequently exits well 10 by openings 22. A valve means 24, which is diagrammatically shown, prevents entry of the fluid into the mined cavity 20. Air entering the semi-permeable shaly sand layer or rock 18 directs water therein to production well 26. This water enters production well 26 via openings 30. Water captured in production well 26 is prevented from leaking into a mined cavity or formation via a valve means 24. This valve means 24 is diagrammatically shown in FIG. 5 and can be a suitable combination of valves, tubing strings, and packers. Water entering production well 26 is removed therefrom via line 28.

Fluids which can be used in the practice of this invention are those with very low solubility in water and include gases, (e.g., natural gas, air, carbon dioxide, nitrogen), oils, polymers, foams, and emulsions. Fluids which set up as a gel or a solid can also be used.

Figure 2:
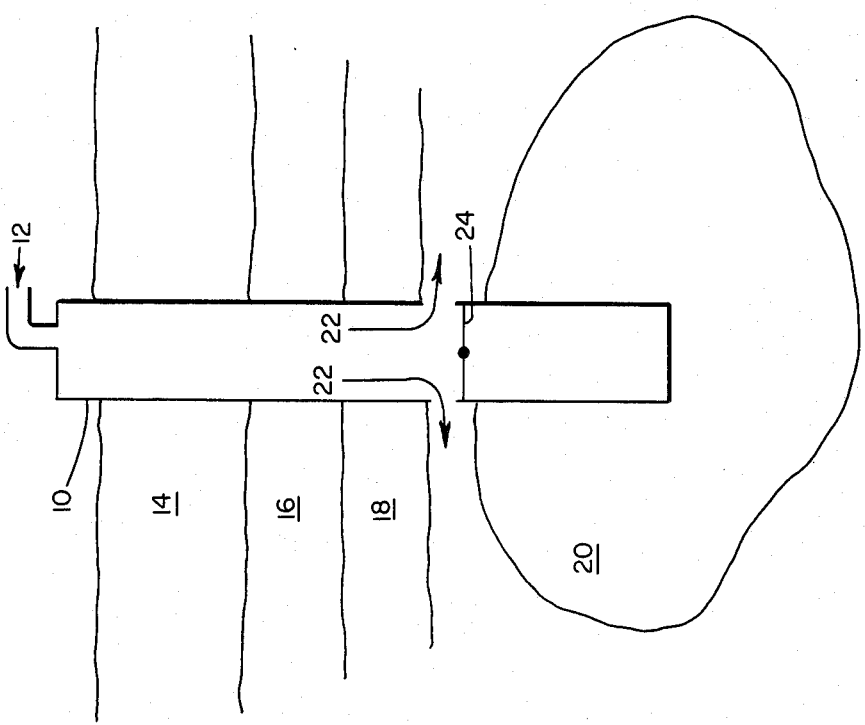
FIG. 2 is a schematic diagram illustrating another embodiment of the invention where a fluid is below the semi-permeable shaly layer.

FIG. 2 depicts another embodiment of this invention. Here, a fluid having a density less than that of water is injected via opening 12 into an injection well 10. The fluid then exits injection well 10 via openings 22 and is placed just below the semi-permeable shaly layer or rock 18. Since the fluid is lighter than water it displaces water from the top of the cavity layer and in the semi-permeable layer 18 and much of it is trapped below said semi-permeable layer. Valve means 24 prevents the fluid injected into said injection well from entering into mined cavity 20. The method of the present invention will work with one injection well or a multiplicity of injection and production wells as is known to those skilled in the art. Of course, valve means 24 must be positioned so as to prevent the fluid from entering into cavity 20. Also, the openings 30 in the production well as shown in FIG. 5, must be positioned to receive the water displaced by the fluid placed below the semi-permeable shaly sand layer or rock 18.

Fluids which can be used in the practice of this invention are those which are substantially immiscible with water and include gases, such as natural gas, air, carbon dioxide, nitrogen, and mixtures thereof. Other fluids which can be used include foams, emulsions and light oils. Additionally, fluids which set up as a gel or a solid can be used.

Figure 3:
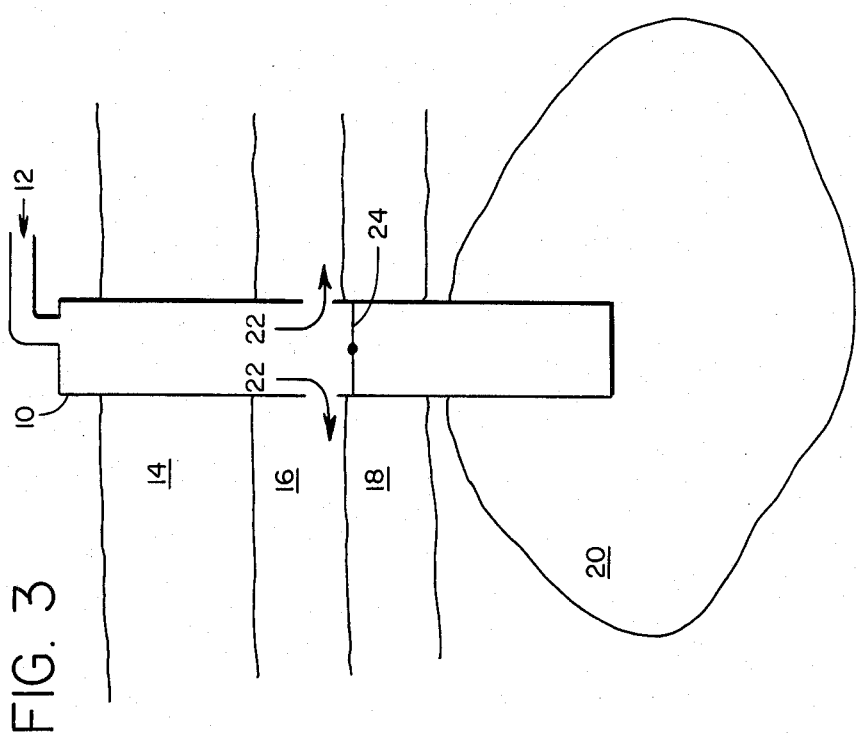
FIG. 3 is a schematic diagram illustrating yet another embodiment of the invention where fluid is placed into the water-bearing source layer.

Another embodiment of this invention is shown in FIG. 3. In this embodiment, as mentioned above, injection well 10 penetrates other strata 14, water bearing source layer 16, semi-permeable shaly sand layer or rock 18, and enters mined cavity 20. A fluid, which is heavier than water and substantially insoluble in it, is injected into the injection well 10 and exits through openings 22 into the water bearing source layer 16. A valve means 24, diagrammatically shown, precludes entrance of the fluid into mined cavity 20. Fluid exiting through openings 22 displaces water from the lower portion of the water-bearing source layer 16 thus impeding entry into mined cavity 20. Although one injection well is utilized in this embodiment, an injection well may be used with at least one production well, as shown in FIG. 5. Openings 30 in the production well 26 should be positioned to allow entry of the water from the water bearing source layer 16. The valve means should be positioned to preclude entry of water into the mined cavity 20. A multiplicity of injection and production wells may be used after making the necessary modifications.

Fluids which will work in the practice of this invention include heavy oil and polymers. Also fluids which set up as a gel or a solid may be used.

Figure 4:
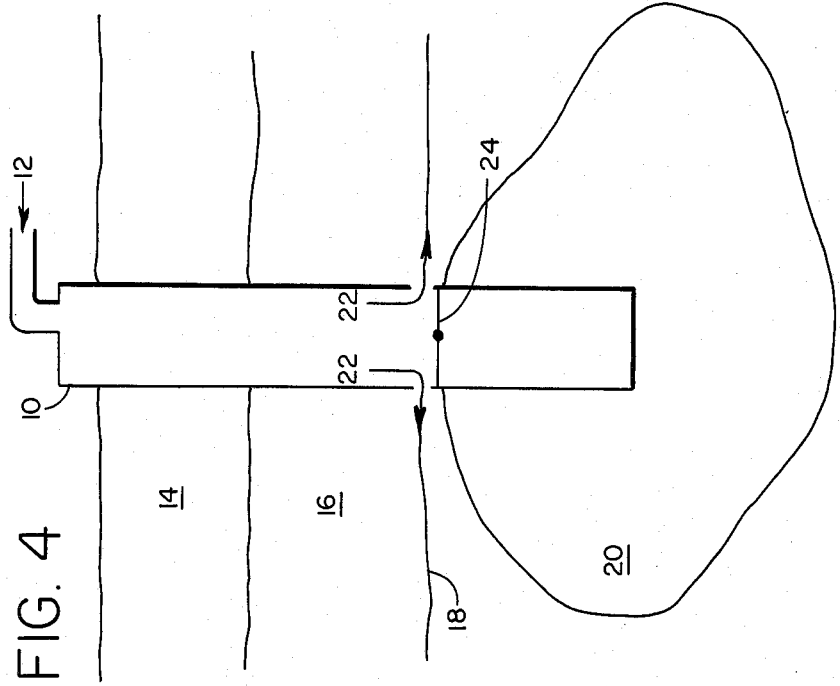
FIG. 4 is a schematic diagram illustrating yet another embodiment of the invention where a fluid is injected substantially near the interface of the water bearing source layer and the formation surrounding the mined cavity.

Another embodiment of this invention is shown in FIG. 4. As shown, injection well 10 penetrates other strata 14, water bearing source layer 16 and a negligible semi-permeable shaly sand layer or rock 18. In this embodiment it is not necessary that the formation contain a semi-permeable shaly sand layer or rock 18. Injection well 10 terminates in mined cavity 20. A fluid is injected into injection well 10 via line 12. The fluid is emitted from openings 22 into the lower portion of the water-bearing source layer 16 and the upper portion of the mined cavity layer. Fluid entering injection well 10 is precluded from entering mined cavity 20 itself via valve means 24. Entry of the fluid above the mined cavity 20 minimizes entry of water into mined cavity 20.

Where no substantial barrier or layer exists between the mined cavity 20 and the water bearing source layer 16, the injection well 10 contains a means for injecting a fluid into a thickness of both source layer 16 and the mined cavity 20 formation at a common boundary between the two. The fluid thus inputed into the common boundary displaces water therefrom and forms a resistance to the downward flow of water.

Although one injection well has been utilized in this embodiment, the method of this invention will work when an injection well is used in combination with at least one production well. As discussed above a multiplicity of injection and production wells may be used.

Fluids which can work in the practice of this invention are those which are substantially immiscible with water and include gases, e.g. natural gas, air, carbon dioxide and nitrogen. Oils, foams, and emulsions may also be used. Fluids which set up as a gel or a solid can also be utilized.

Any of the above embodiments can be combined with a means for maintaining the pressure in a mined cavity at, or substantially near, the pressure of incoming water to minimize water influx or entry into a mined cavity.

Moreover, while the described embodiments show minimization of water entry or intrusion in an existing mined cavity, the method can work prior to forming the cavity. Initial displacement of water from the designated formation layer or layers is accomplished, preferably, prior to the creation of the underlying cavity. However, the method can be applied during the creation of the cavity.

As can be appreciated this method can be applied once during the creation of the cavity or repeated as required. Where desired, the method can be used as a continuous process.

Each of the above embodiments may be used alone or in combination with other embodiments, as will be apparent to those skilled in the art. Depending on the nature of the cavity in the formation, the amount of water seepage, and the mining process employed, an injection borehole may be used alone or in combination with other boreholes. Additionally, as required, a fluid may be used alone or in combination with other fluids.

Obviously, many other variations and modifications of this invention, as previously set forth, may be made without departing from the spirit and scope of this invention as those skilled in the art will readily understand. Such variations and modifications are considered part of this invention, and within the purview and scope of the appended claims.

What is claimed is:

1. A method for minimizing the intrusion of water into a mined cavity in a subterranean formation which is overlain by a semi-permeable layer of shaly sand or other similar material above which layer is the water-bearing source layer comprising:
    (a) inserting a means for placing a fluid just below the semi-permeable layer; and
    (b) placing the fluid, with a density less than that of water, just below the semi-permeable layer which fluid via physical means only displaces water in the semi-permeable layer and is trapped below said layer thereby creating by physical means only a barrier to the entry of water into the mined cavity.

2. The method as recited in claim 1 where the means for placing the fluid below the semi-permeable layer comprises at least one injection well.

3. The method as recited in claim 1 where the means for placing the fluid below the semi-permeable layer and displacing water therefrom comprises at least one injection well and at least one production well.

4. The method as recited in claim 1 where the fluid is a gas.

5. The method as recited in claim 4 where the gas is air.

6. The method as recited in claim 4 where the gas is natural gas.

7. The method as recited in claim 4 where the gas is carbon dioxide.

8. The method as recited in claim 4 where the gas is nitrogen.

9. The method as recited in claim 1 where the fluid is a foam.

10. The method as recited in claim 1 where the fluid is an emulsion.

11. The method as recited in claim 1 where the fluid is a light oil.

* * * * *